United States Patent
Malinowski

(10) Patent No.: US 6,646,432 B1
(45) Date of Patent: Nov. 11, 2003

(54) ELECTRONIC ODOMETER INTEGRATED INTO VEHICLE AXLE AND WHEEL HUB

(75) Inventor: Mark E. Malinowski, Farmington Hills, MI (US)

(73) Assignee: Meritor Heavy Vehicle Systems, LLC, Troy, MI (US)

( * ) Notice: Subject to any disclaimer, the term of this patent is extended or adjusted under 35 U.S.C. 154(b) by 0 days.

(21) Appl. No.: 09/185,779

(22) Filed: Nov. 4, 1998

(51) Int. Cl.$^7$ ................................ G01P 3/44
(52) U.S. Cl. .................. 324/171; 73/490; 377/24.1; 324/174
(58) Field of Search ............ 324/207.2, 207.21, 324/207.25, 174, 166, 171; 377/19–24.1; 73/490; 702/158

(56) References Cited

U.S. PATENT DOCUMENTS

| | | | |
|---|---|---|---|
| 3,358,230 A | * 12/1967 | Wiley ........................ 324/171 |
| 3,437,926 A | * 4/1969 | Spaulding et al. .......... 324/171 |
| 3,477,022 A | * 11/1969 | Le Masters ................ 324/171 |
| 3,548,165 A | * 12/1970 | Linnenkamp ............... 377/15 |
| 3,588,814 A | * 6/1971 | Furlong ..................... 340/444 |
| 3,700,164 A | 10/1972 | Slagle |
| 3,735,103 A | 5/1973 | Finley |
| 3,739,270 A | 6/1973 | Miller et al. |
| 3,772,549 A | * 11/1973 | Cumming ................. 310/168 |
| 3,780,272 A | 12/1973 | Rohner |
| 3,916,234 A | * 10/1975 | Stigall et al. .............. 310/155 |
| 3,949,252 A | * 4/1976 | Riesenberg et al. ....... 310/168 |
| 3,972,022 A | * 7/1976 | Goto et al. ................ 324/174 |
| 3,995,491 A | * 12/1976 | Wolfla, II ................ 73/379.07 |
| 4,167,699 A | 9/1979 | Baker |
| 4,176,397 A | 11/1979 | Crom et al. |
| 4,491,007 A | 1/1985 | Crowdes, Jr. |
| 4,646,042 A | * 2/1987 | Eshelman ................... 324/174 |
| 4,682,287 A | 7/1987 | Mizuno et al. |
| 4,697,278 A | * 9/1987 | Fleischer ..................... 377/24 |
| 4,797,612 A | * 1/1989 | Nakanishi et al. .......... 324/173 |
| 4,989,222 A | * 1/1991 | Lutts et al. ................ 377/24.1 |
| 5,291,130 A | * 3/1994 | Kendzior .................... 324/174 |
| 5,511,435 A | * 4/1996 | Kitamura et al. .......... 73/865.9 |
| 5,524,034 A | * 6/1996 | Srygley et al. ............... 377/15 |
| 5,721,539 A | * 2/1998 | Goetzl ....................... 340/870.3 |
| 5,742,160 A | * 4/1998 | Bergstedt et al. ....... 324/207.25 |
| 5,893,893 A | * 4/1999 | Holt et al. .................... 701/35 |
| 6,011,827 A | * 1/2000 | Kyrtsos ..................... 377/24.1 |
| 6,062,080 A | * 5/2000 | Kramer ....................... 73/490 |
| 2001/0052258 A1 | * 12/2001 | Ehrlich et al. ............. 73/118.1 |

FOREIGN PATENT DOCUMENTS

| | | | |
|---|---|---|---|
| GB | 2350198 | * | 11/2000 |
| JP | 207525 | * | 7/2000 |

* cited by examiner

*Primary Examiner*—Jay Patidar
(74) *Attorney, Agent, or Firm*—Carlson, Gaskey & Olds

(57) ABSTRACT

An axle assembly includes an axle defining an axis, a wheel assembly rotatably supported on the axle for rotating relative to the axle axis, a magnet, a sensor responsive to the magnet for producing a count signal, and a microprocessor for receiving count signal data, calculating the distance the wheel assembly has traveled, and transmitting distance data to an output device. The sensor is mounted to rotate with the wheel assembly and the magnet is mounted to the axle, at a position eccentric to or radially offset from the axle axis. The sensor is mounted to the wheel assembly in radial alignment with the magnet such that rotation of the wheel assembly aligns the sensor for magnetic interaction with or responsiveness to the magnet once per revolution of the wheel assembly.

23 Claims, 3 Drawing Sheets

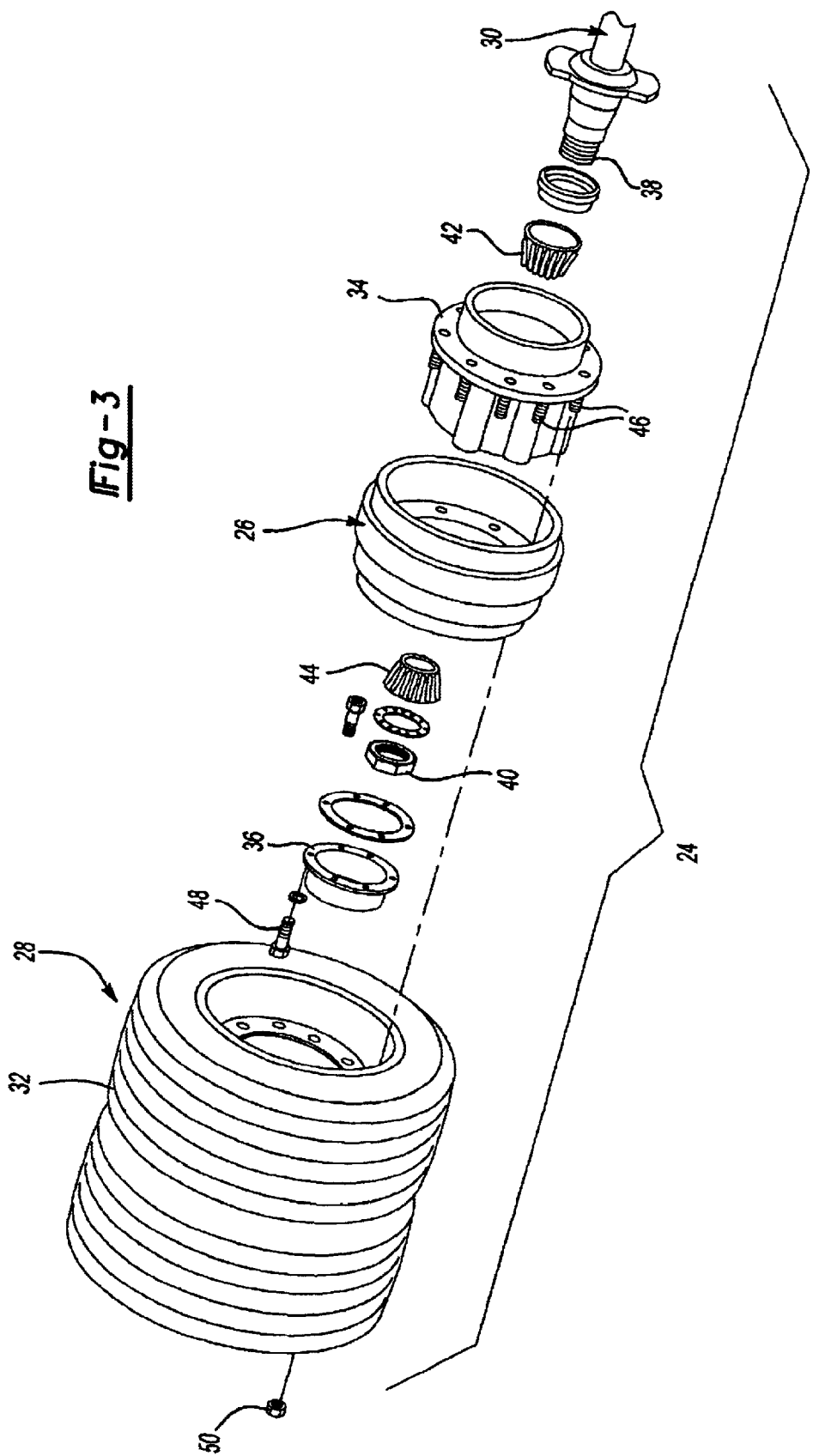

ELECTRONIC ODOMETER INTEGRATED INTO VEHICLE AXLE AND WHEEL HUB

BACKGROUND OF THE INVENTION

This application relates to a unique system for electronically measuring the distance that a tractor and/or trailer has traveled by using a magnet attached to an axle to actuate a sensor mounted to rotate with a wheel. The sensor gathers, stores, and transmits mileage data to an output device.

Tractor-trailer vehicles are used to haul numerous types of cargo to various locations. One tractor may haul several different trailers in a single day as the tractor delivers a first trailer to one location, unloads the first trailer, picks up a second trailer and drives it to the next location, etc. Also, other tractors may be taking the unloaded trailers to new locations to be reloaded. Thus, the tractors and the trailers travel different distances resulting in different total mileages for any given day.

Because the trailers are hauled by different tractors it is often difficult to determine how many miles each trailer has traveled. Tractors have odometers which keep track of the total miles traveled by the tractor, but trailers typically do not have odometers. It is, however, important for a vehicle operator to know how many miles a trailer has traveled during a specific day and how many total miles the trailer has traveled.

The most common method that is used to keep track of trailer mileage is a mechanical odometer that is well known in the art. Mechanical odometers, however, are expensive, relatively inaccurate and unreliable, and prone to damage and theft. Furthermore, mechanical odometers are typically installed on a trailer axle, thus making the visual extraction of mileage readings inconvenient. An electronic odometer has been proposed as an attachment to a wheel hub. This electronic hub odometer requires a complex pivotally suspended mounting means to operate properly. As a result, this electronic hub odometer is expensive and prone to failure.

SUMMARY OF THE INVENTION

In a disclosed embodiment of this invention, an axle assembly is integrated with an electronic odometer. The axle assembly includes an axle defining an axis, a wheel assembly rotatably supported on the axle for rotating relative to the axle axis, a magnet, a sensor responsive to the magnet for producing a count signal, and a microprocessor for receiving count signal data, calculating the distance the wheel assembly has traveled, and transmitting distance data to an output device. The sensor is mounted to either the wheel assembly or the axle and the magnet is mounted to the other of the wheel assembly and the axle.

In a preferred embodiment of this invention, the magnet is mounted to the axle at a position which is eccentric to, or radially offset from, the axle axis. The sensor is mounted to the wheel assembly in radial alignment with the magnet such that rotation of the wheel assembly aligns the sensor for magnetic interaction or responsiveness to the magnet once per revolution of the wheel assembly.

The present invention provides a reliable and inexpensive solution to the shortcomings of prior art hub odometers. The inventive integrated axle and odometer assembly provides quick and convenient access for data extraction. Further, the inventive electronic odometer design can be easily installed or retrofit onto to current axle assemblies.

These and other features of the present invention will be best understood from the following specification and drawings, the following of which is a brief description.

BRIEF DESCRIPTION OF THE DRAWINGS

FIG. 3 is an exploded, perspective view of the axle assembly.

DETAILED DESCRIPTION OF THE PREFERRED EMBODIMENT

Figure 1:
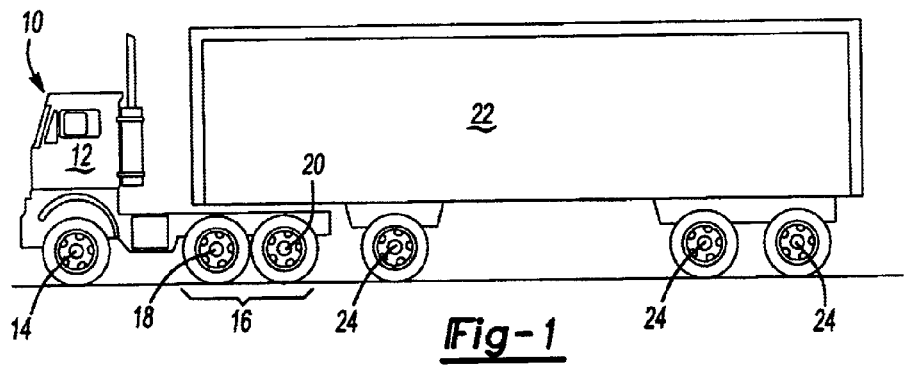
FIG. 1 is a side elevational view of a vehicle including an axle assembly integrated with an electronic odometer in accordance with the present invention.

FIG. 1 is a side elevational view of a heavy vehicle 10 including an axle assembly integrated with an electronic odometer in accordance with the present invention. The heavy vehicle 10 includes a tractor 12 with a front steering axle 14 and a rear drive axle 16. The front steering axle 14 can be either a driving or a non-driving axle. The tandem drive axle 16 is comprised of a front drive axle 18 and a rear drive axle 20. The tractor 12 pulls a trailer 22 which has trailer axles 24. The trailer axles 24 are typically non-drive axles. The invention can be used on any vehicle such as an automobile, pick-up truck, or tractor-trailer. The heavy vehicle 10 is used only for descriptive purposes and is not intended as a limitation of the invention.

Figure 2:
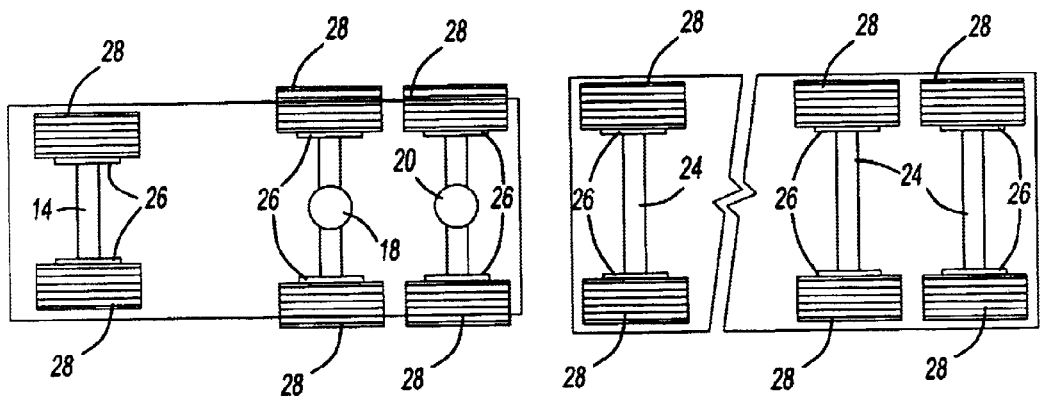
FIG. 2 is an enlarged, fragmentary bottom view of the vehicle shown in FIG. 1.

FIG. 2 is an enlarged, fragmentary bottom view of the heavy vehicle 10 shown in FIG. 1. Each axle 14, 18, 20 and 24 includes a brake assembly 26 mounted to a wheel assembly 28. The brake assemblies 26 can be of various types known in the art, including drum brakes, disc brakes, air disc brakes, or wet disc brakes. The wheel assemblies 28 can also be of various configurations known in the art.

FIG. 3 is an exploded, perspective view of one trailer axle assembly 24. Each trailer axle assembly 24 includes a wheel assembly 28, a brake drum assembly 26, and an axle 30. The wheel assembly 28 includes a wheel 32, a hub 34, and a hub cap 36. The axle 30 includes a threaded spindle end 38 and a jam nut 40. To assemble the trailer axle assembly 24, the hub 34 and bearings 42 and 44 are slid onto the spindle end 38 of the axle 30 and the jam nut 40 is threaded onto the spindle end 38 to rotatably support the hub 34 on the axle 30. The brake drum assembly 26 is then installed over wheel studs 46 protruding from the hub 34 and the hub cap 36 is bolted to the hub 34 with cap screws 48. The wheel 32 is then mounted onto the wheels studs 46 of the hub 34 with lug nuts 50. Accordingly, the wheel 32, the brake drum assembly 26, the hub 34, and the hub cap 36 rotate together in relation to the stationary or non-rotating axle 30.

Figure 4:
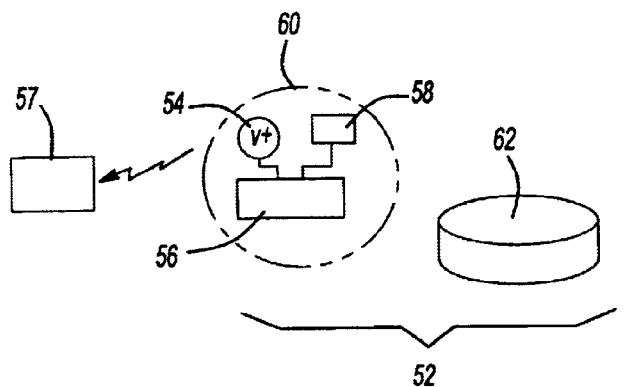
FIG. 4 is an electrical schematic diagram of the electronic odometer in accordance with the present invention.

FIG. 4 is an electrical schematic diagram of the electronic odometer 52 in accordance with the present invention. The electronic odometer 52 includes an internal power source 54, a microprocessor 56, a sensor 58, and a permanent magnet 62. The internal power source 54, the microprocessor 56, and the sensor 58 are mounted in a button housing 60. The electronic odometer 52 is designed to be integrated with one axle on the heavy vehicle 10, typically a trailer axle assembly 24. Accordingly, the button housing 60 is mounted to either the wheel assembly 28 or the axle 30 and the magnet 62 is mounted to the other of the wheel assembly 28 and the axle 30.

The sensor 58 is designed to respond to the magnet 62 by producing a count signal. The microprocessor 56 receives the count signals, calculates the distance the wheel assembly 28 has traveled, and transmits the distance data to an output device 57. Preferably, the magnet 62 produces a magnetic field and the sensor 58 includes a micro-miniature reed switch for detecting the magnetic field of the magnet 62 and producing a count signal in response to each magnetic field detection. Specifically, the reed switch is configured so that the alignment of the magnet 62 and the reed switch produces a momentary discrete switch closure and hence a detectable count signal for each revolution of the wheel assembly 28. Each count signal is transmitted from the sensor 58 to the microprocessor 56. Calibrated with the diameter of the wheel assembly 28, the microprocessor 56 uses the count signal data (or, in other words, the number of wheel assembly revolutions) to calculate the distance that the wheel assembly 28 has traveled. A device which meets the functional and packaging requirements of the electronic odometer 52 is manufactured by Dallas Semiconductor Corporation located in Dallas, Tex. One particular Dallas Semiconductor part, part number DS2423, has been modified to incorporate a micro-miniature reed switch to meet the functional and packaging requirements of the electronic odometer 52.

To make the extraction of distance data convenient, the button housing 60 must be easily accessible. Currently, various output devices for the extraction of data from the microprocessor 56 in the button housing 60 are commercially available.

Figure 5:
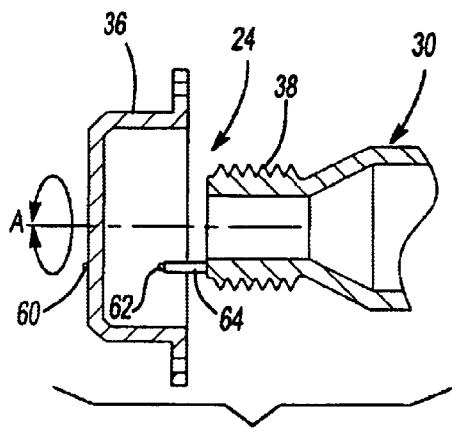
FIG. 5 is a fragmentary, cross-sectional view of a first embodiment of the axle assembly integrated with the electronic odometer in accordance with the present invention.

FIG. 5 is a fragmentary, cross-sectional view of a first embodiment of the trailer axle assembly 24 integrated with the electronic odometer 52 in accordance with the present invention. In FIG. 5, the trailer axle assembly 24 is fragmented to show the assembled relationship of the rotatable hub cap 36 and the stationary or non-rotatable axle 30. The axle 30 defines an axis A. The hub cap 36, which is rotatably supported on the axle 30, rotates relative to the axle axis A. In this first embodiment, the button housing 60, containing the sensor 58, is mounted for rotation with the hub cap 36 and the magnet 62 is mounted, interiorly adjacent to the hub cap 36 and the sensor 58, on a bracket 64 extending from the spindle end 38 of the axle 30.

As shown in FIG. 5, the magnet 62 is mounted eccentric to or radially offset from the axle axis A. The button housing 60 is mounted to the hub cap 36 in radial alignment with the magnet 62 such that rotation of the hub cap 36 aligns the sensor 58, contained in the button housing 60, for magnetic interaction with or responsiveness to the magnet 62 once per revolution of the hub cap 36.

Figure 6:
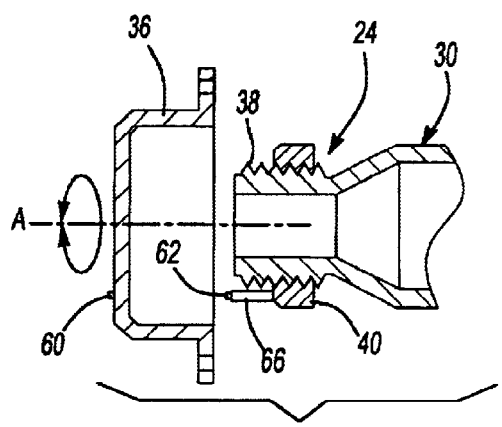
FIG. 6 is a fragmentary, cross-sectional view of a second embodiment of the axle assembly integrated with the electronic odometer in accordance with the present invention.

FIG. 6 is a fragmentary, cross-sectional view of a second embodiment of the trailer axle assembly 24 integrated with the electronic odometer 52 in accordance with the present invention. In FIG. 6, the trailer axle assembly 24 is fragmented to show the assembled relationship of the rotatable hub cap 36 and the stationary or non-rotatable axle 30. The axle 30 defines an axis A. The hub cap 36, which is rotatably supported on the axle 30, rotates relative to the axle axis A. In this second embodiment, the button housing 60, containing the sensor 58, is mounted for rotation with the hub cap 36 and the magnet 62 is mounted interiorly adjacent to the hub cap 36 on a bracket 66 extending from the jam nut 40 threaded to the spindle end 38 of the axle 30.

As shown in FIG. 6, the magnet 62 is mounted eccentric to or radially offset from the axle axis A. The button housing 60 is mounted to the hub cap 36 in radial alignment with the magnet 62 such that rotation of the hub cap 36 aligns the sensor 58, contained in the button housing 60, for magnetic interaction with or responsiveness to the magnet 62 once per revolution of the hub cap 36.

Figure 7:
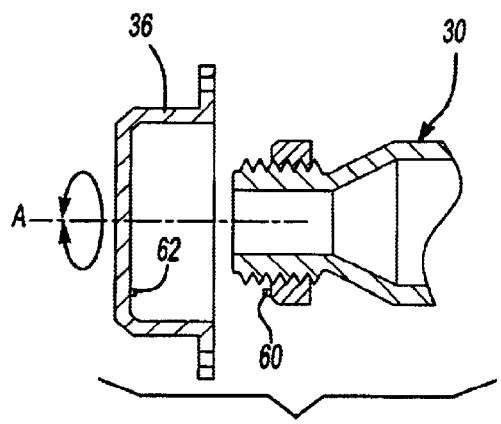
FIG. 7 schematically shows an alternative embodiment.

As shown in FIG. 7, the magnet 62 can be mounted on the hubcap 36 with the sensor 60 mounted on the axle 30.

Preferred embodiments of this invention have been disclosed, however, a worker of ordinary skill in the art would recognize that certain modifications would come within the scope of this invention. For that reason, the following claims should be studied to determine the true scope and content of this invention.

What is claimed is:

1. An axle assembly including an electronic odometer, the assembly comprising:
    a non-rotating axle member having a spindle end defining an axis;
    a rotating wheel assembly including a wheel hub supported on said spindle end for rotation about said axis;
    a magnet;
    a sensor responsive to said magnet for producing a count signal;
    a microprocessor for receiving count signal data, calculating the distance said wheel assembly has traveled, and transmitting distance data to an output device; and
    said sensor mounted to one of said wheel hub or said axle member and said magnet mounted to the other of said wheel hub or said axle member.

2. An axle assembly as set forth in claim 1 wherein said wheel hub includes a hub cap mounted for rotation with said wheel assembly and wherein said sensor is mounted to said hub cap.

3. An axle assembly as set forth in claim 2 wherein said axle member includes a bracket extending from said axle member toward said hub cap with said magnet being mounted on said bracket adjacent said hub cap.

4. An axle assembly as set forth in claim 3 wherein said bracket extends from said spindle end towards said hub cap.

5. An axle assembly as set forth in claim 3 wherein said axle member includes a jam nut for threaded attachment to said spindle end of said axle member with said bracket extending from said jam nut towards said hub cap.

6. An axle assembly as set forth in claim 2 wherein said magnet is mounted to said axle member eccentrically relative to said axis.

7. An axle assembly as set forth in claim 6 wherein said sensor is mounted to said hub cap in radial alignment with said magnet such that rotation of said hub cap aligns said sensor for magnetic responsiveness to said magnet once per revolution of said hub cap.

8. An axle assembly as set forth in claim 1 wherein said magnet produces a magnetic field and said sensor includes a micro-miniature reed switch for detecting the magnetic field of said magnet and producing the count signal.

9. An axle assembly as set forth in claim 1 wherein said sensor and said microprocessor are mounted in a button housing.

10. An axle assembly as set forth in claim 9 wherein said button housing contains an internal power source.

11. An axle assembly as set forth in claim 1 wherein said magnet and said sensor are mounted at approximately equal radial distances from said axis such that rotation of said wheel assembly relative to said axle member aligns said sensor and said magnet once per revolution of said wheel assembly.

12. An axle assembly including an electronic odometer, the assembly comprising:
- a non-rotating axle member;
- a wheel hub rotatably supported on said axle member for rotation about an axis;
- a magnet;
- a sensor for generating a count signal in response to interaction with said magnet;
- a microprocessor for receiving said count signal, compiling distance data based on said count signal, and transmitting said distance data to an output device wherein said sensor is mounted to one of said wheel hub or said axle member and said magnet mounted to the other of said wheel hub or said axle member.

13. An axle assembly as set forth in claim 12 wherein said magnet is mounted to said non-rotating axle member and said sensor is mounted to said wheel hub.

14. An axle assembly as set forth in claim 13 including a hub cap mounted for rotation with said wheel hub, said sensor being mounted on an external face of said hub cap.

15. An axle assembly as set forth in claim 13 including dedicated power source for supplying power to said microprocessor.

16. An axle assembly as set forth in claim 15 wherein said sensor, said microprocessor and said dedicated power source are mounted within a common housing attached to said hub.

17. An axle assembly as set forth in claim 13 wherein said non-rotating axle member is a spindle.

18. An axle assembly as set forth in claim 13 wherein said non-rotating axle member is a jam nut threaded onto an axle spindle.

19. An axle assembly as set forth in claim 12 wherein said magnet is mounted to said hub and said sensor is mounted to said non-rotating axle member.

20. An axle assembly as set forth in claim 19 including a hub cap mounted to said hub and wherein said non-rotating axle member is a spindle.

21. An axle assembly as set forth in claim 20 including a dedicated power source for said microprocessor wherein said microprocessor, said sensor, and said dedicated power source are mounted within a common housing attached to said spindle.

22. An axle assembly as set forth in claim 12 wherein said magnet and said sensor are radially spaced from said axis.

23. An axle assembly as set forth in claim 22 wherein said magnet and said sensor are mounted at approximately equal radial distances from said axis such that rotation of said wheel hub relative to said non-rotating axle member aligns said sensor and said magnet once per revolution of said wheel hub.

\* \* \* \* \*